Dec. 18, 1956  R. S. HEYM  2,774,220
CONTROL FOR A REFRIGERATION SYSTEM
Filed July 23, 1953  2 Sheets-Sheet 1
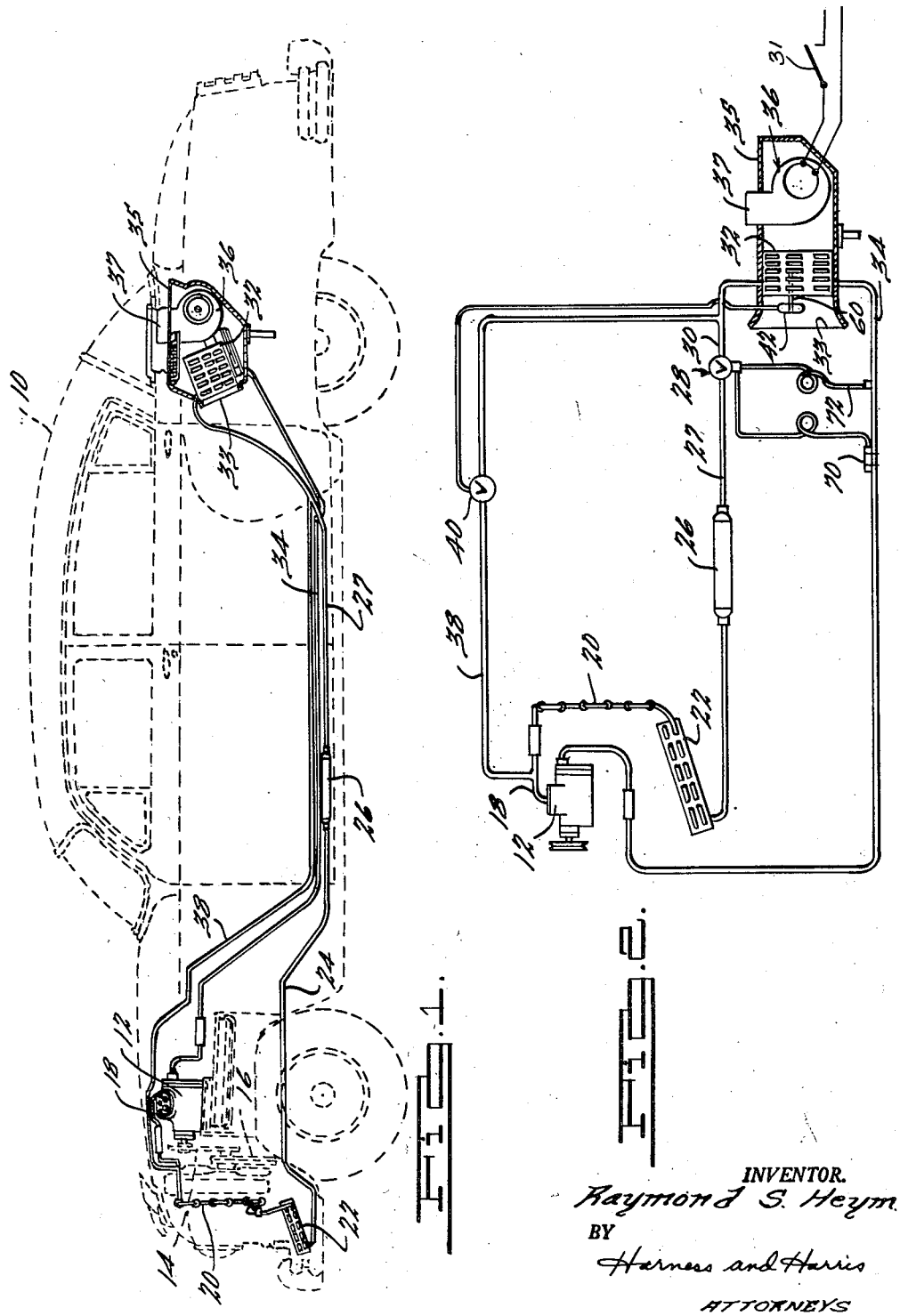
INVENTOR.
Raymond S. Heym
BY
Harness and Harris
ATTORNEYS

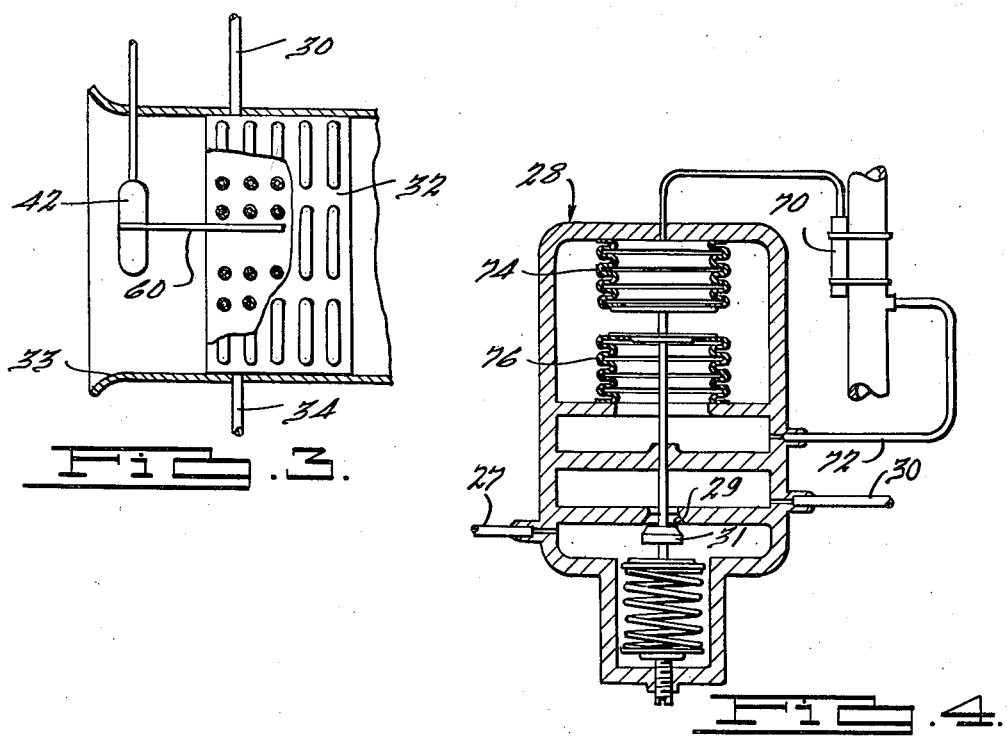
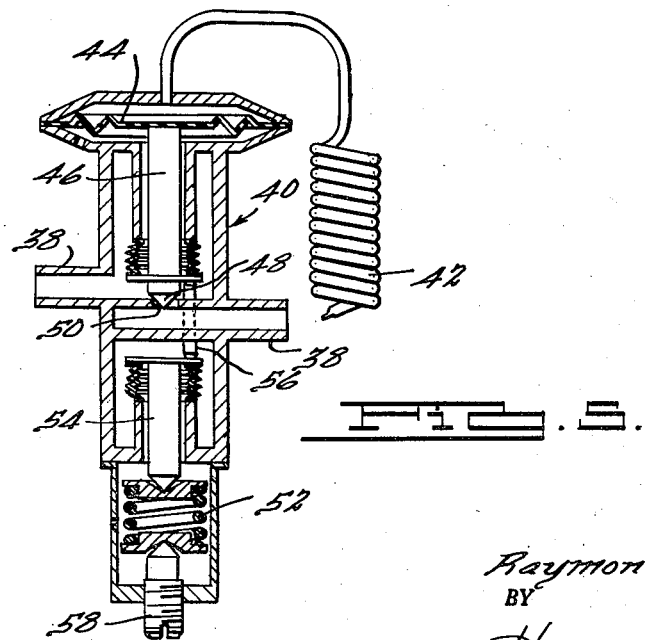

United States Patent Office 2,774,220
Patented Dec. 18, 1956

2,774,220

CONTROL FOR A REFRIGERATION SYSTEM

Raymond S. Heym, Birmingham, Mich., assignor to Chrysler Corporation, Highland Park, Mich., a corporation of Delaware Application July 23, 1953, Serial No. 369,761

1 Claim. (Cl. 62—3)

This invention relates to a control for a refrigeration system and more particularly to a temperature sensing device for actuating a temperature responsive control valve.

This invention will be described in connection with an automobile air conditioning system as it was designed primarily for such an application.

It is a principle object of this invention to provide a temperature responsive valve for controlling the bypassing of uncondensed refrigerant to an evaporator and to provide such a valve for this purpose which is sensitive to the temperature of air in an air cooling duct when blowers associated with the duct are operating and sensitive to evaporator temperature when such blowers are inoperative.

It is an additional object of the invention to provide an improved control for a refrigeration system which diverts hot gas to the evaporator when the cooling load is less than maximum.

It is also an object of this invention to provide a control for a refrigeration system which maintains a sufficiently rapid flow of refrigerant through the system to return entrained oil to the compressor even under conditions when the evaporator blowers are inoperative.

In the drawings:

Fig. 1 is a diagrammatic view of an automobile air conditioning system to which my invention is applied;

Fig. 2 is a diagram of the refrigeration system;

Fig. 3 is an enlarged fragmentary view of the evaporator and thermal bulb shown in Fig. 2;

Fig. 4 is a diagrammatic view of the expansion valve shown in Fig. 2; and

Fig. 5 is a diagrammatic view of the bypass valve shown in Fig. 2.

In Fig. 1 an automobile 10 which is equipped with a car air conditioning device is illustrated. A compressor 12 is mounted in the engine compartment of the automobile and is mechanically driven by belts 14 and 16 from the automobile engine. A refrigerant line 18 carries the discharged compressed refrigerant from the compressor 12 to a condenser which is illustrated as of the split type comprising a first condenser section 20 and a lower condenser section 22. The upper condenser section is cooled by air which passes through it as an incident to the operation of the engine fan and as an incident to motion of the vehicle. Similarly, the lower condenser section 22 is cooled by air which moves relative to it as an incident to motion of the vehicle.

The condensed refrigerant is conducted by a line 24 to a conventional receiver 26 which serves as a storage container whose function is to insure a supply of liquid refrigerant to an expansion valve 28, which is illustrated in Fig. 2. A line 27 conducts refrigerant from the receiver 26 to the expansion valve 28. A line 30 conducts refrigerant from the expansion valve to an evaporator 32 and a suction line 34 conducts refrigerant from the evaporator back to the compressor 12. The evaporator is of conventional construction and acts as a low pressure region in which the refrigerant boils and reverts to gaseous form, absorbing heat in the process and thereby cooling the evaporator coil and the air passing over it.

A casing 35 is provided in the rear portion of the vehicle to house the evaporator 32 and a blower 36. The casing 35 has an air inlet opening 33 in communication with the passenger compartment of the automobile and the blower 36 has a scroll 37 which discharges air into the passenger compartment. The scroll 37 and casing 35 cooperate to define an air duct and the blower 36 induces a flow of air from the interior of the car over the evaporator coil 32 and returns it to the interior of the car. The blower 36 is preferably electrically driven with a switch 31 operably interposed in one of the electrical connections to provide a manual control for selectively rendering the blower 36 operative and inoperative.

The expansion valve 28 which is mentioned above is of conventional construction and will, therefore, be referred to only briefly. Fig. 4 is a schematic diagram of this valve 28 and it comprises an orifice 29 and a movable valve element 31 which is adapted to open and close the orifice 29. The orifice 29 controls the passage of refrigerant from line 27 to line 30. The effective size of the orifice 29 is controlled by the temperature and pressure of the refrigerant in the compressor suction lines by means of a thermal bulb 70, a pressure line 72 and bellows 74 and 76. The valve's function is to regulate the flow of refrigerant into the evaporator 32, making full use of its evaporating capacity by preventing liquid Freon from reaching compressor suction line 34 where its presence would endanger the compressor. For any given pressure (which varies with the compressor speed), a temperature rise in the suction line tends to open the valve since this indicates the need for greater refrigerant flow to use full coil capacity. The opposite condition also tends to close the valve.

An additional line 38 which is connected to the line 18 between the compressor and the condenser is also connected to the line 30 between the expansion valve 28 and the evaporator 32 and serves to conduct uncondensed refrigerant directly from the compressor to the evaporator. The diversion of hot gas to the evaporator controls the evaporator coil temperature and prevents the car from getting too cold. At the same time this diversion of hot gas reduces the compressor work load under conditions of low cooling demand.

The bypass line 38 is controlled by a temperature responsive valve 40 which is positioned in that line and capable of regulating the flow of refrigerant therethrough. The valve 40 has a thermal bulb 42 which is illustrated as positioned in the casing 35 upstream of the evaporator coil 32. This thermal bulb regulates the bypass valve 40 so that the line 38 bypasses hot refrigerant directly from the compressor to the evaporator whenever the air temperature falls to a preselected minimum. This raises the temperature of the evaporator coil and the cooling air; it also prevents ice forming on the evaporator coil when the blower 36 is stopped, and maintains sufficiently rapid circulation of refrigerant to carry entrained oil back to the compressor.

The valve 40 in the bypass line is illustrated in Fig. 5 and includes a diaphragm 44 which moves downwardly in Fig. 5 when the thermal bulb 42 is warm. A valve stem 46 which is connected to the diaphragm and carries a valve element 48 serves to prevent communication of the inlet line 38 with the outlet through an orifice 50. When the temperature inside the car falls below a predetermined value the vapor in the thermal bulb contracts and lowers the pressure in the diaphragm 44 enough to allow a spring 52 to act through plungers 54 and 56 to move the valve element 48 away from the orifice 50 and thereby open the valve to admit hot refrigerant gas to the evaporator coil. An adjusting screw 58 is provided to preselect the temperature to which the valve will be responsive.

A small band or strip 60 is provided in heat transfer relation with the thermal bulb 42 and the evaporator coil 32. This strip 60 may be made of any material which readily conducts heat although an aluminum strip has been found to operate satisfactorily. The benefits which are provided by strip 60 are most important during operating conditions when the blowers are off and the compressor is running. Under these conditions there is a negligible amount of warm air passing over the evaporator and there is thus very little heat supplied to the evaporator to evaporate refrigerant. In a device which did not incorporate the strip 60 the expansion valve 28 would close down in response to the low temperature of bulb 70 and substantially all flow of oil and refrigerant would be cut off so that the compressor would be starved of lubricant. However, in a device provided with the strip 60 when the blowers are turned off the aluminum strip 60 conducts heat away from the thermal bulb to the very cold evaporator coil 32 thereby actuating the valve 40 and permitting hot uncondensed refrigerant gas to be dumped into the evaporator. This raises the suction temperature in line 34 which in turn causes the expansion valve 48 to open and this maintains a sufficiently rapid flow of refrigerant through the system to return entrained oil to the compressor. The strip 60 also assures that the bypass valve 40 will be actuated to dump hot refrigerant into the evaporator to prevent the evaporator coil from having ice form thereon when the blowers are not running, but the compressor is running.

I claim:

In a refrigerating system of the compressor, condenser and evaporator type having an air duct, said evaporator being positioned in said duct, air propelling means associated with said duct and operable to induce a circulation of air through said duct and over said evaporator, control means for selectively rendering said air propelling means operative and inoperative, an expansion valve interposed between the condenser and evaporator and a bypass line for delivering uncondensed refrigerant to a point in the circuit between the expansion valve and the evaporator, the combination of a thermal bulb responsive valve in said bypass line for controlling the capacity thereof, a thermal bulb operatively connected to said valve and positioned in the path of the circulating air, and a body of heat conducting material positioned in heat transfer relationship with said thermal bulb and said evaporator, said body of heat conducting material having a relatively small surface area as compared to the surface area of said thermal bulb so that when said air propelling means is operating the air temperature is the controlling factor in determining the temperature of said thermal bulb.

References Cited in the file of this patent

UNITED STATES PATENTS

| | | |
|---|---|---|
| 2,245,049 | Pearce | June 10, 1941 |
| 2,403,818 | McGrath | July 9, 1946 |
| 2,614,394 | McGrath | Oct. 21, 1952 |
| 2,666,299 | Sutton | Jan. 19, 1954 |